(12) United States Patent (10) Patent No.: US 12,654,674 B2
Seo (45) Date of Patent: Jun. 16, 2026

(54) CONTROL DEVICE FOR HYBRID VEHICLE

(71) Applicant: TOYOTA JIDOSHA KABUSHIKI KAISHA, Toyota (JP)

(72) Inventor: Hiromitsu Seo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 18/975,061

(22) Filed: Dec. 10, 2024

(65) Prior Publication Data

US 2025/0249884 A1 Aug. 7, 2025

(30) Foreign Application Priority Data

Feb. 6, 2024 (JP) .................................. 2024-016572

(51) Int. Cl.
*B60W 20/00* (2016.01)
*F02D 41/32* (2006.01)
*F02D 41/38* (2006.01)

(52) U.S. Cl.
CPC ............. *B60W 20/00* (2013.01); *F02D 41/32* (2013.01); *F02D 41/38* (2013.01); *B60W 2510/0676* (2013.01); *F02D 2041/389* (2013.01); *F02D 2200/021* (2013.01); *F02D 2200/0606* (2013.01)

(58) Field of Classification Search
CPC ......... B60W 20/00; B60W 2510/0676; B60W 20/15; F02D 41/32; F02D 41/38; F02D 2041/389; F02D 2200/021; F02D 2200/0606; F02D 41/042; F02D 2200/0602; F02D 2250/02; F02D 41/3094; B60L 2240/545; B60L 1/006; B60L 50/16; B60L 50/15; B60K 6/445; B60K 6/24; Y02T 10/62
See application file for complete search history.

(56) References Cited

U.S. PATENT DOCUMENTS

| | | | |
|---|---|---|---|
| 6,024,064 | A | 2/2000 | Kato et al. |
| 2006/0207568 | A1 | 9/2006 | Miyazaki et al. |
| 2014/0230793 | A1 | 8/2014 | Mashiki |
| 2021/0107452 | A1* | 4/2021 | Nose ....................... F02D 29/02 |

FOREIGN PATENT DOCUMENTS

| | | |
|---|---|---|
| JP | H10-54318 A | 2/1998 |
| JP | 4542135 B2 | 9/2010 |
| JP | 5704244 B2 | 4/2015 |
| JP | 2016-156355 A | 9/2016 |

* cited by examiner

*Primary Examiner* — Rodney A Butler
(74) *Attorney, Agent, or Firm* — Oliff PLC

(57) ABSTRACT

A control device, for a hybrid vehicle including an engine and a motor as traveling power sources, includes an injection rate control unit, an external power supply determination unit, and a fuel temperature determination unit.

2 Claims, 3 Drawing Sheets

CONTROL DEVICE FOR HYBRID VEHICLE

CROSS-REFERENCE TO RELATED APPLICATION

This application is based upon and claims the benefit of priority of the prior Japanese Patent Application No. 2024-016572, filed on Feb. 6, 2024, the entire contents of which are incorporated herein by reference.

TECHNICAL FIELD

The present disclosure relates to a control device for a hybrid vehicle.

BACKGROUND

There is a hybrid vehicle including an engine and a motor as traveling power sources. The motor generates electric power based on power of the engine. The engine includes a port injection valve, an in-cylinder injection valve, a low-pressure delivery pipe, a low-pressure pipe, a high-pressure delivery pipe, a high-pressure pipe, and a high-pressure pump (see, for example, Japanese Unexamined Patent Application Publication No. 2016-156355).

It is conceivable that the motor is caused to generate electric power by the power of the engine during stopping of the vehicle to execute external power supply. In this case, the engine cannot be cooled by the traveling wind because the vehicle is stopped, and the engine might be high in temperature. As a result, a temperature of fuel excessively increases in any of the low-pressure delivery pipe, the low-pressure pipe, the high-pressure delivery pipe, the high-pressure pipe, and the high-pressure pump, and vapor is generated, which might reduce the control accuracy of the air-fuel ratio.

SUMMARY

It is therefore an object of the present disclosure to provide a control device for a hybrid vehicle, which suppresses generation of vapor in a low-pressure delivery pipe, a low-pressure pipe, a high-pressure delivery pipe, a high-pressure pipe, and a high-pressure pump.

The above object is achieved by a control device for a hybrid vehicle including an engine and a motor as traveling power sources, the engine including: a port injection valve; an in-cylinder injection valve; a low-pressure delivery pipe that supplies low-pressure fuel to the port injection valve; a low-pressure pipe that supplies the low-pressure fuel to the low-pressure delivery pipe; a high-pressure delivery pipe that supplies high-pressure fuel, with a pressure higher than a pressure of the low-pressure fuel, to the in-cylinder injection valve; a high-pressure pipe and a high-pressure pump that supply the high-pressure fuel to the high-pressure delivery pipe; and the motor being capable of generating electric power based on power of the engine, the control device including: an injection rate control unit configured to control a port injection rate that is a ratio of a fuel injection amount from the port injection valve to a total fuel injection amount from the port injection valve and the in-cylinder injection valve, and to control an in-cylinder injection rate that is a ratio of a fuel injection amount from the in-cylinder injection valve to the total fuel injection amount; an external power supply determination unit configured to determine whether a vehicle-stop external power supply process is being executed or not, the vehicle-stop external power supply process being causing the motor to generate electric power based on power of the engine to execute external power supply; and a fuel temperature determination unit configured to execute a temperature determination to determine whether a temperature of the high-pressure fuel is higher than a temperature of the low-pressure fuel or not, when the external power supply determination unit makes an affirmative determination, wherein when the external power supply determination unit and the fuel temperature determination unit make affirmative determinations, the injection rate control unit is configured to decrease the port injection rate and to increase the in-cylinder injection rate as compared with when the external power supply determination unit makes a negative determination, and when the external power supply determination unit makes an affirmative determination and the fuel temperature determination unit makes a negative determination, the injection rate control unit is configured to increase the port injection rate and to decrease the in-cylinder injection rate as compared with when the external power supply determination unit makes a negative determination.

The control device, for the hybrid vehicle, may further include: an engine temperature determination unit configured to determine whether a temperature of the engine is higher than a first threshold value or not; and an ambient temperature determination unit configured to determine whether an ambient temperature around the engine is higher than a second threshold value or not, wherein the fuel temperature determination unit may be configured to execute the temperature determination, when the external power supply determination unit, the engine temperature determination unit, and the ambient temperature determination unit make affirmative determinations.

DETAILED DESCRIPTION

[Schematic Configuration of Hybrid Vehicle]

Figure 1:
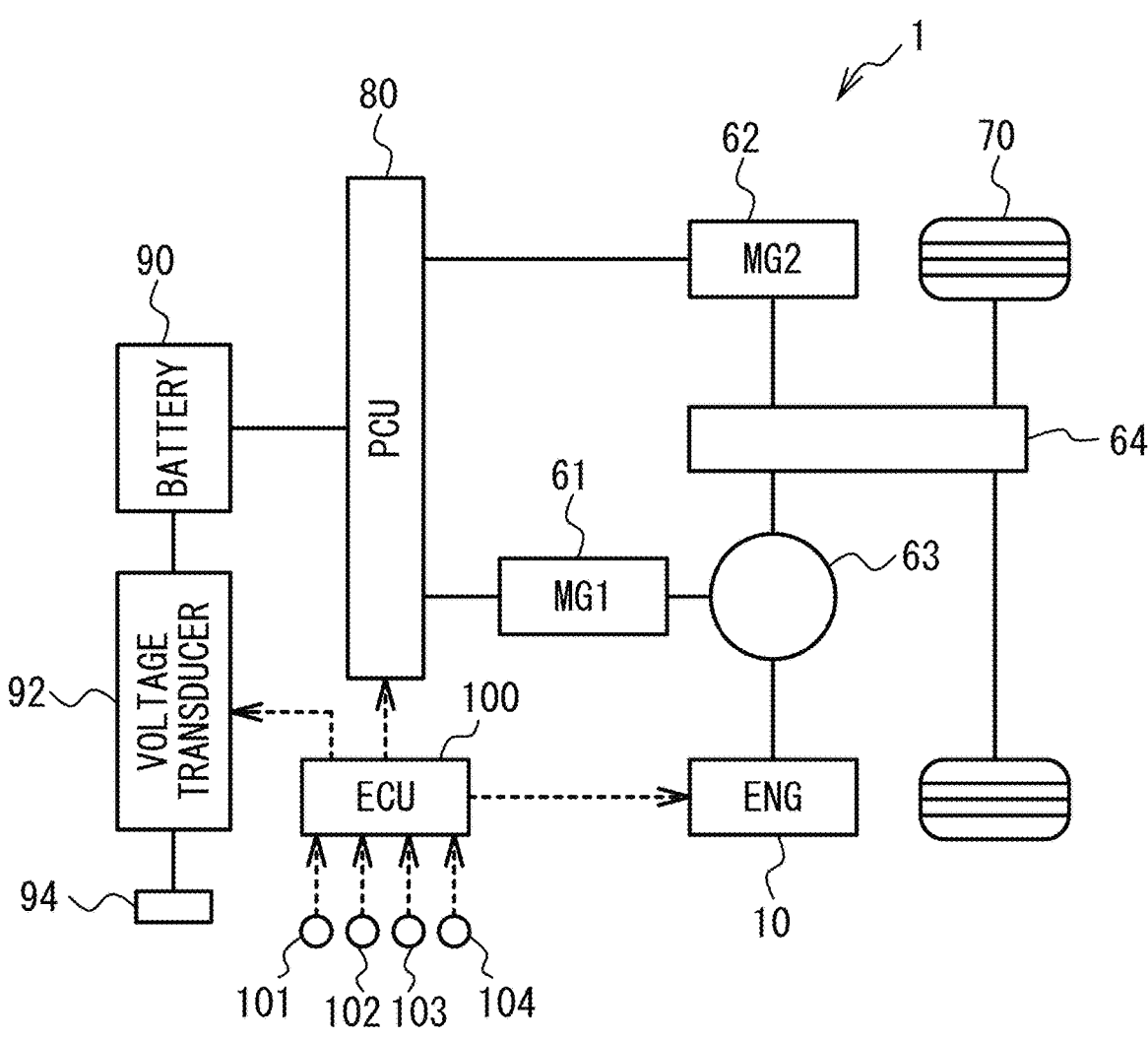
FIG. 1 is a schematic configuration view of a hybrid vehicle.

FIG. 1 is a schematic configuration view of a hybrid vehicle 1. The hybrid vehicle 1 includes an engine 10, a first motor 61, a second motor 62, a power split mechanism 63, a transmission mechanism 64, driving wheels 70, a PCU 80, a battery 90, a voltage transducer 92, an external power supply port 94, and an electronic control unit (ECU) 100. The engine 10, the first motor 61, and the second motor 62 are mounted as traveling power sources for the hybrid vehicle 1.

The first motor 61 and the second motor 62 are connected to the battery 90 via the PCU 80. The first motor 61 and the second motor 62 function as motors that generate a driving force of the vehicle in response to power supply from the battery 90. The first motor 61 and the second motor 62 also function as generators that generate regenerative electric power for charging the battery 90 in response to power transmitted from the engine 10 and the driving wheels 70. The electric power transmitted between the first motor 61 and the second motor 62 and the battery 90 is adjusted by the PCU 80. The PCU 80 is controlled by the ECU 100. The PCU 80 converts a DC voltage from the battery 90 into an AC voltage, or converts an AC voltage from the first motor 61 or the second motor 62 into a DC voltage.

The power split mechanism 63 mechanically couples a crankshaft of the engine 10, a rotation shaft of the first motor 61, and an output shaft of the power split mechanism 63. The power split mechanism 63 is, for example, a planetary gear mechanism including a sun gear, a planetary carrier, a pinion gear, and a ring gear.

The output shaft of the power split mechanism 63 is coupled to the transmission mechanism 64. The rotation shaft of the second motor 62 is also coupled to the transmission mechanism 64. The driving force of the engine 10, the first motor 61, and the second motor 62 is transmitted to the driving wheels 70 via the transmission mechanism 64.

The voltage transducer 92 is driven by the ECU 100 during external power supply. The voltage transducer 92 converts the DC power supplied from the battery 90 into the AC power and outputs the AC power to the external power supply port 94. When a connector (not illustrated) is connected to the external power supply port 94 from the outside, the electric power stored in the battery 90 is supplied to, for example, a power system in a house. The ECU 100 executes a vehicle-stop external power supply process in which the engine 10 is driven during the vehicle stop to cause the first motor 61 to generate electric power to execute the external power supply. Since the external power supply is executed while generating the electric power by the first motor 61, for example, the power is supplied to an external device requiring a large amount of electric power.

The ECU 100 is an electronic control unit equipped with arithmetic processing circuitry that executes various arithmetic processes related to vehicle driving control, and a memory in which control programs and data are stored. The ECU 100 is an example of a control device for the hybrid vehicle 1, and functionally achieves an external power supply determination unit, a fuel temperature determination unit, an injection rate control unit, an engine temperature determination unit, and an ambient temperature determination unit, which will be described in detail later.

A vehicle speed sensor 101, a crank angle sensor 102, a water temperature sensor 103, and an engine ambient temperature sensor 104 are electrically connected to the ECU 100. The vehicle speed sensor 101 detects the traveling speed of the hybrid vehicle 1. The crank angle sensor 102 detects the rotational speed of the engine 10. The water temperature sensor 103 detects the temperature of the coolant that cools the engine 10. The engine ambient temperature sensor 104 is disposed in an engine compartment and detects the ambient temperature around the engine 10.

[Schematic Configuration of Engine]

Figure 2:
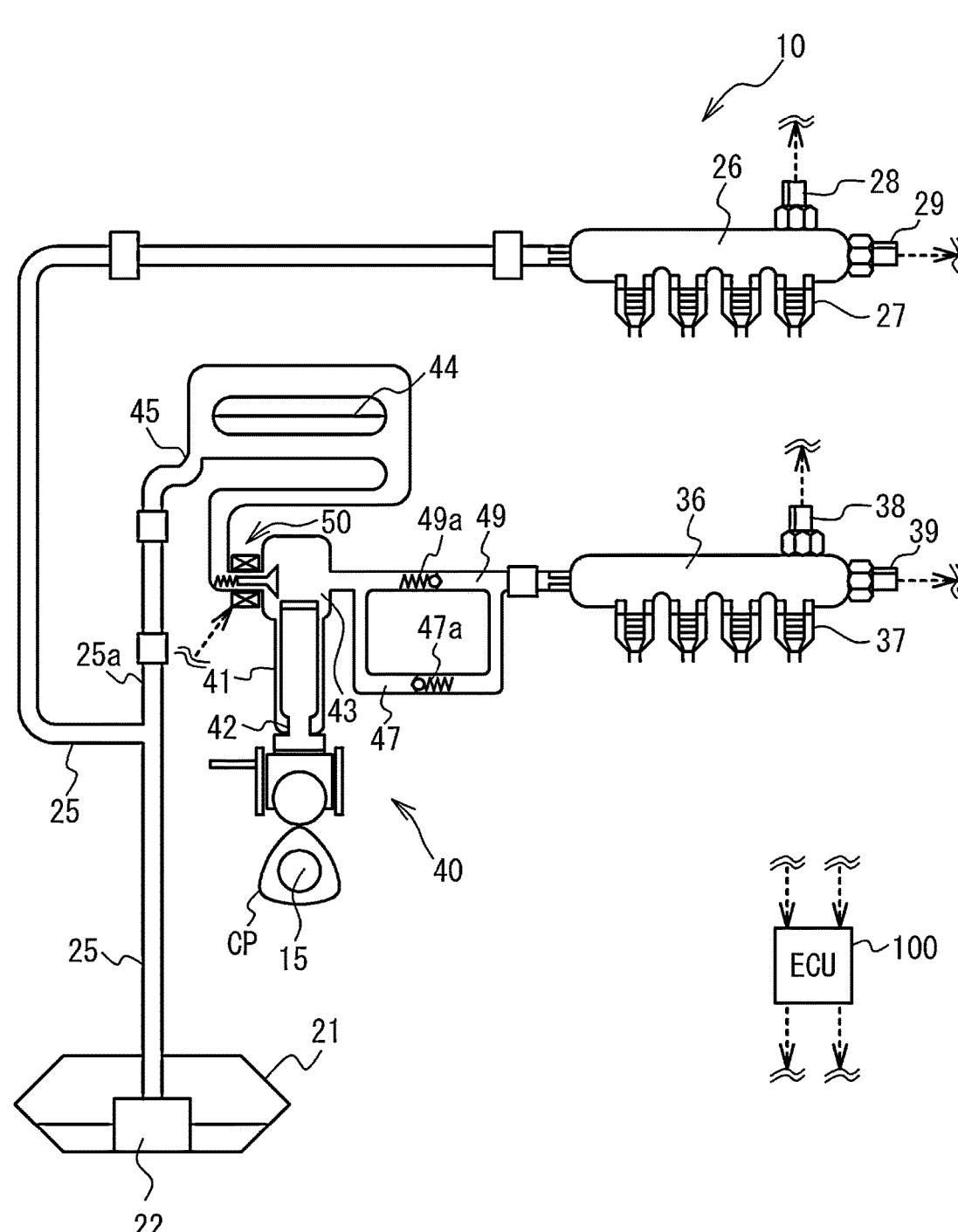
FIG. 2 is a schematic configuration view of an engine.

FIG. 2 is a schematic configuration view of the engine 10. The engine 10 includes a fuel tank 21, a low-pressure pump 22, a low-pressure pipe 25, a low-pressure delivery pipe 26, a high-pressure delivery pipe 36, fuel pressure sensors 28 and 38, fuel temperature sensors 29 and 39, and a high-pressure pump 40.

The engine 10 is a spark ignition type four cylinder gasoline engine including port injection valves 27 that inject fuel into each intake port and in-cylinder injection valves 37 that inject fuel into each cylinder. The engine 10 also includes a camshaft 15 that is linked to the crankshaft and drives an intake valve or an exhaust valve.

The fuel tank 21 stores fuel. The low-pressure pump 22 pressurizes the fuel in the fuel tank 21 and discharges the fuel to the low-pressure pipe 25. The fuel discharged into the low-pressure pipe 25 is supplied to the port injection valves 27 via the low-pressure delivery pipe 26, and is also supplied to the high-pressure pump 40 via a high-pressure pipe 25a that branches off from the low-pressure pipe 25. The high-pressure pump 40 pressurizes the fuel supplied from the high-pressure pipe 25a and discharges the pressurized fuel to the high-pressure delivery pipe 36. The fuel pressurized by the high-pressure pump 40 is supplied to the in-cylinder injection valves 37 via the high-pressure delivery pipe 36.

The fuel pressure sensors 28 and 38 detect the fuel pressure in the low-pressure delivery pipe 26 and the high-pressure delivery pipe 36, respectively. The fuel temperature sensors 29 and 39 detect the temperatures of the fuel in the low-pressure delivery pipe 26 and the high-pressure delivery pipe 36, respectively. The ECU 100 acquires detection values of the fuel pressure sensors 28 and 38 and the fuel temperature sensors 29 and 39.

The ECU 100 changes the port injection rate and the in-cylinder injection rate in accordance with the operation region of the engine 10. The port injection rate is a ratio of fuel injection from the port injection valve 27 to the total fuel injection amount from the port injection valve 27 and the in-cylinder injection valve 37. The in-cylinder injection rate is a ratio of the fuel injection amount from the in-cylinder injection valve 37 to the total fuel injection amount. For example, when the operation region of the engine 10 is a low load region, the port injection rate is 100% and the in-cylinder injection rate is 0%. When the operation region of the engine 10 is the high load region, the port injection rate is 0% and the in-cylinder injection rate is 100%. When the operation region of the engine 10 is the medium load region, the port injection rate and the in-cylinder injection rate are, for example, 50%, respectively. The port injection rate and the in-cylinder injection rate are controlled such that the sum of the port injection rate and the in-cylinder injection rate is always 100%.

The high-pressure pump 40 includes a cylinder 41, a plunger 42, a pressurizing chamber 43, a suction passage 45, a discharge passage 47, a relief passage 49, a suction valve 50, a discharge valve 47a, and a relief valve 49a. The plunger 42 is moved up and down in the cylinder 41 by the rotation of a cam CP which rotates together with the camshaft 15. The volume of the pressurizing chamber 43 increases and decreases in accordance with the upward movement and the downward movement of the plunger 42. The pressurizing chamber 43 is defined by the cylinder 41 and the plunger 42.

The suction passage 45 communicates the pressurizing chamber 43 with the high-pressure pipe 25a branched from the low-pressure pipe 25. A pulsation damper 44 for suppressing fuel pressure pulsation is provided in the suction passage 45. The relief passage 49 communicates the pressurizing chamber 43 with the high-pressure delivery pipe 36. The discharge passage 47 bypasses the relief valve 49a and communicates with the relief passage 49. The discharge valve 47a allows fuel to flow from the pressurizing chamber 43 to the high-pressure delivery pipe 36 in the discharge passage 47, but regulates the flow of the fuel in the reverse direction. The relief valve 49a allows fuel to flow from the high-pressure delivery pipe 36 to the pressurizing chamber 43, but regulates the flow of the fuel in the reverse direction.

The suction valve 50 is an electromagnetic valve controlled by the ECU 100. The suction valve 50 is opened, and the plunger 42 moves downward, so that the fuel is filled into the pressurizing chamber 43 from the high-pressure pipe 25a via the suction passage 45. Next, the suction valve 50 is closed, and the plunger 42 moves upward, so that the fuel in the pressurizing chamber 43 is pressurized. Next, when the fuel pressure force acting on the discharge valve 47a from the pressurizing chamber 43 exceeds a predetermined pressure, the discharge valve 47a opens and pressurized fuel is supplied to the high-pressure delivery pipe 36. The relief value 49a opens when the fuel pressure in the high-pressure delivery pipe 36 excessively increases.

[Vapor Generation Suppression Control]

Figure 3:
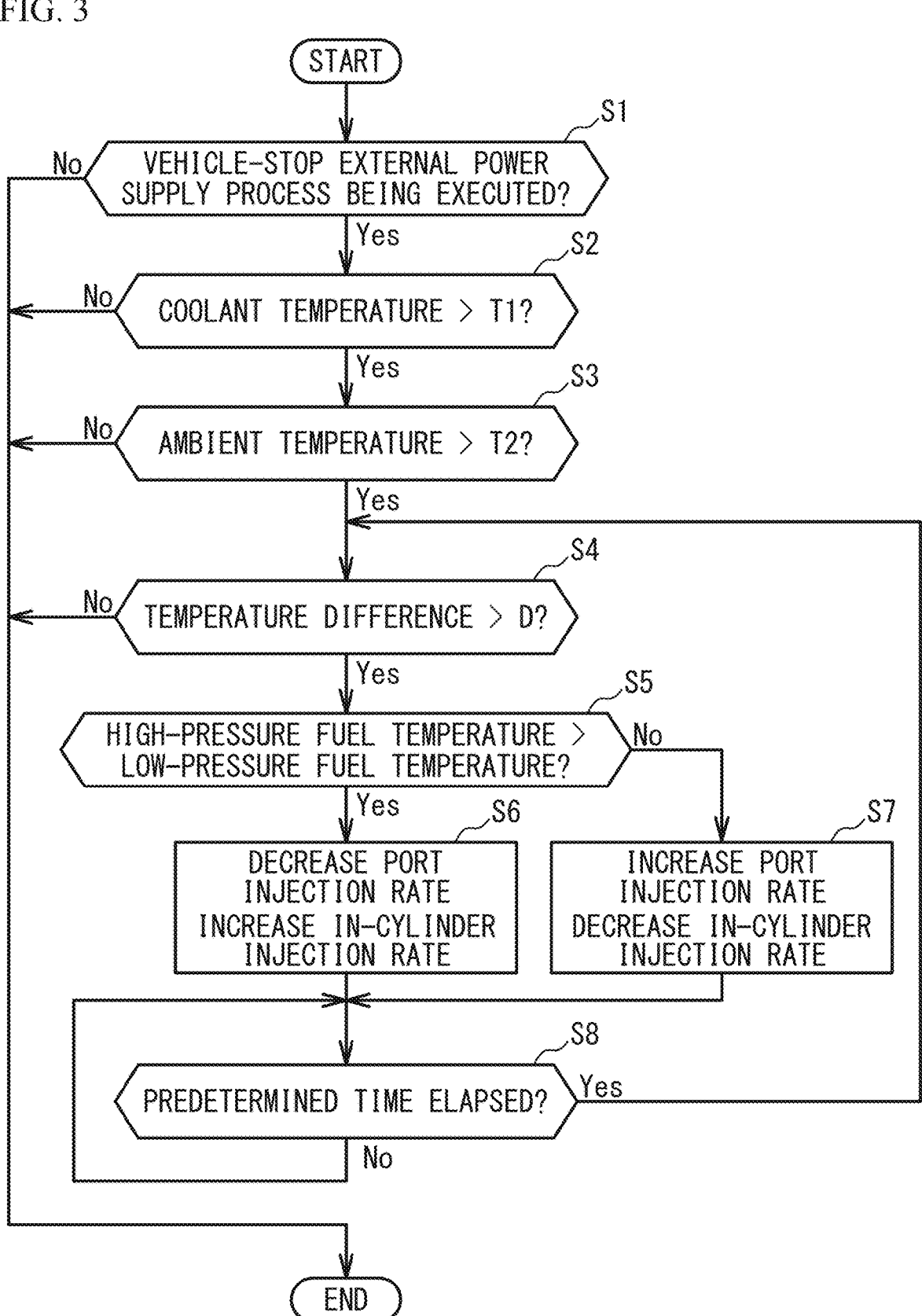
FIG. 3 is a flowchart illustrating an example of vapor generation suppression control.

FIG. 3 is a flowchart illustrating an example of vapor generation suppression control. The ECU 100 determines whether the above-described vehicle-stop external power supply process is being executed or not (step S1). If the determination result in step S1 is No, the control ends. Step S1 is an example of a process executed by the external power supply determination unit.

If the determination result in step S1 is Yes, the ECU 100 determines whether the temperature of the coolant is higher than a first reference value T1 or not on the basis of the water temperature sensor 103 (step S2). The first reference value T1 is set to an upper limit of the coolant temperature at which vapor is unlikely to be generated in any of the low-pressure delivery pipe 26, the low-pressure pipe 25, the high-pressure delivery pipe 36, the high-pressure pipe 25a, and the high-pressure pump 40. The temperature of the coolant is an example of the temperature of the engine 10. Therefore, for example, the temperature of the engine oil that lubricates the engine 10 may be used as the temperature of the engine 10. If the determination result is No in step S2, it is considered that the possibility of vapor generation in the low-pressure delivery pipe 26, the low-pressure pipe 25, the high-pressure delivery pipe 36, the high-pressure pipe 25a, and the high-pressure pump 40 is low, and the control ends. Step S2 is an example of a process executed by the engine temperature determination unit. The term "in the high-pressure pump 40" means a portion of the high-pressure pump 40 that is filled with fuel. Specifically, the term "in the high-pressure pump 40" means the inside of the pressurizing chamber 43, the suction passage 45, the discharge passage 47, and the relief passage 49.

If the determination result in step S2 is Yes, the ECU 100 determines whether the ambient temperature around the engine 10 is higher than a second reference value T2 or not based on the engine ambient temperature sensor 104 (step S3). The second reference value T2 is set to an upper limit value of the ambient temperature around the engine 10 at which the vapor is less likely to be generated in any of the low-pressure delivery pipe 26, the low-pressure pipe 25, the high-pressure delivery pipe 36, the high-pressure pipe 25a, and the high-pressure pump 40. If the determination result is No in step S3, it is considered that the possibility of vapor generation in the low-pressure delivery pipe 26, the low-pressure pipe 25, the high-pressure delivery pipe 36, the high-pressure pipe 25a, and the high-pressure pump 40 is low, and the control ends. For example, if the hood of the hybrid vehicle 1 is opened, the ambient temperature around the engine 10 will decrease, which will promote heat dissipation in the low-pressure pipe 25 and high-pressure pipe 25a and vapors will not occur. Step S3 is an example of a process executed by the ambient temperature determination unit.

If the determination result is Yes in step S3, the ECU 100 determines whether a difference in temperature between the low-pressure fuel and the high-pressure fuel is greater than a predetermined value D based on the fuel temperature sensors 29 and 39 (step S4). The predetermined value D is set to prevent hunting of control, which will be described in detail later. If the determination result in step S4 is No, the low-pressure fuel and the high-pressure fuel are regarded as having substantially the same temperature, and the control ends.

If the determination result in step S4 is Yes, the ECU 100 executes temperature determination to determine whether the temperature of the high-pressure fuel is higher than that of the low-pressure fuel or not on the basis of the fuel temperature sensors 29 and 39 (step S5). Step S5 is an example of a process executed by the fuel temperature determination unit.

If the determination result is Yes in step S5, the ECU 100 decreases the port injection rate by a predetermined ratio and increases the in-cylinder injection rate by the same ratio (step S6). For example, the port injection rate is decreased by 10%, and the in-cylinder injection rate is increased by 10%. Thus, the injection amount of the high-pressure fuel, which is higher in temperature than the low-pressure fuel, from the in-cylinder injection valve 37 increases. As a result, new high-pressure fuel is supplied to the high-pressure pipe 25a, the high-pressure pump 40, and the high-pressure delivery pipe 36. This suppresses excessive temperature rise of the high-pressure fuel in the high-pressure delivery pipe 36, the high-pressure pipe 25a, and the high-pressure pump 40, and suppresses generation of vapor. Step S6 is an example of a process executed by the injection rate control unit.

If the determination result is No in step S5, the ECU 100 increases the port injection rate by a predetermined ratio and decreases the in-cylinder injection rate by the same ratio (step S7). For example, the port injection rate is increased by 10%, and the in-cylinder injection rate is decreased by 10%. This increases the injection amount of the low-pressure fuel, which is higher in temperature than the high-pressure fuel, from the port injection valve 27. As a result, new low-pressure fuel is supplied to the low-pressure delivery pipe 26 and the low-pressure pipe 25. Thus, the temperature of the low-pressure fuel in the low-pressure delivery pipe 26 and the low-pressure pipe 25 is prevented from excessively increasing, and the generation of vapor is prevented. Step S7 is an example of a process executed by the injection rate control unit.

Next, the ECU 100 determines whether or not a predetermined time has elapsed from the execution of step S6 or S7 (step S8). If the determination result is No in step S8, step S8 is executed again. If the determination result is Yes in step S8, step S4 is executed again. That is, fuel injection at the in-cylinder injection rate and the port injection rate set in step S6 or S7 is executed for a predetermined time.

As described above, when the determination result is Yes in steps S2 and S3, step S4 and subsequent steps are executed. In steps S2 and S3, it is determined whether or not an environmental condition in which vapor may be generated is satisfied. When the environmental condition is satisfied in this way, it is determined that vapor might be generated, so step S4 and subsequent steps are executed. Here, the fuel efficiency might be deteriorated by the execution of step S6 or S7. Therefore, by making the condition that the environmental conditions of step S2 and S3 are satisfied the requirement for execution of step S6 or S7, it is possible to avoid easy execution of step S6 or S7 when the possibility of vapor generation is not high. In this way, both the deterioration of the fuel efficiency and the suppression of the generation of the vapor are achieved.

The above-described step S4 is executed to suppress control hunting in which the port injection rate and the in-cylinder injection rate are frequently switched in a short time. This is because, when step S4 is not executed, the port injection rate and the in-cylinder injection rate are switched even if the difference in temperature between the high-pressure fuel and the low-pressure fuel is a slight difference. Step S8 is also executed to suppress control hunting.

In steps S4 and S5, the determination is made based on the fuel temperature sensors 29 and 39, but not limited thereto. For example, the temperatures of the low-pressure fuel and the high-pressure fuel may be estimated without using the fuel temperature sensor. For example, the temperature of the low-pressure fuel in the low-pressure delivery pipe 26 may be estimated according to the operating state of the engine 10 in consideration of the lengths and thermal conductivities of the low-pressure pipe 25 and the low-pressure delivery pipe 26. Similarly, the temperature of the high-pressure fuel in the high-pressure delivery pipe 36 may be estimated according to the operating state of the engine 10 in consideration of the lengths and thermal conductivities of the high-pressure pipe 25a, the suction passage 45, and the discharge passage 47.

Although some embodiments of the present disclosure have been described in detail, the present disclosure is not limited to the specific embodiments but may be varied or changed within the scope of the present disclosure as claimed.

What is claimed is:

1. A control device for a hybrid vehicle including an engine and a motor as traveling power sources, the engine including:

a port injection valve;

an in-cylinder injection valve;

a low-pressure delivery pipe that supplies low-pressure fuel to the port injection valve;

a low-pressure pipe that supplies the low-pressure fuel to the low-pressure delivery pipe;

a high-pressure delivery pipe that supplies high-pressure fuel, with a pressure higher than a pressure of the low-pressure fuel, to the in-cylinder injection valve;

a high-pressure pipe and a high-pressure pump that supply the high-pressure fuel to the high-pressure delivery pipe; and the motor being capable of generating electric power based on power of the engine, the control device comprising:

an injection rate control unit configured to control a port injection rate that is a ratio of a fuel injection amount from the port injection valve to a total fuel injection amount from the port injection valve and the in-cylinder injection valve, and to control an in-cylinder injection rate that is a ratio of a fuel injection amount from the in-cylinder injection valve to the total fuel injection amount;

an external power supply determination unit configured to determine whether a vehicle-stop external power supply process is being executed or not, the vehicle-stop external power supply process being causing the motor to generate electric power based on power of the engine to execute external power supply; and a fuel temperature determination unit configured to execute a temperature determination to determine whether a temperature of the high-pressure fuel is higher than a temperature of the low-pressure fuel or not, when the external power supply determination unit makes an affirmative determination, wherein when the external power supply determination unit and the fuel temperature determination unit make affirmative determinations, the injection rate control unit is configured to decrease the port injection rate and to increase the in-cylinder injection rate as compared with when the external power supply determination unit makes a negative determination, and when the external power supply determination unit makes an affirmative determination and the fuel temperature determination unit makes a negative determination, the injection rate control unit is configured to increase the port injection rate and to decrease the in-cylinder injection rate as compared with when the external power supply determination unit makes a negative determination.

2. The control device for the hybrid vehicle according to claim 1, further comprising:

an engine temperature determination unit configured to determine whether a temperature of the engine is higher than a first threshold value or not; and an ambient temperature determination unit configured to determine whether an ambient temperature around the engine is higher than a second threshold value or not, wherein the fuel temperature determination unit is configured to execute the temperature determination, when the external power supply determination unit, the engine temperature determination unit, and the ambient temperature determination unit make affirmative determinations.

* * * * *